United States Patent [19]

Vermeer

[11] Patent Number: 4,910,950
[45] Date of Patent: Mar. 27, 1990

[54] MACHINE FOR FORMING LARGE ROUND BALES

[75] Inventor: Gary J. Vermeer, Pella, Iowa

[73] Assignee: Vermeer Manufacturing Co., Pella, Iowa

[21] Appl. No.: 351,927

[22] Filed: May 15, 1989

[51] Int. Cl.⁴ .................. A01D 39/00; A01D 75/00
[52] U.S. Cl. .......................... 56/341; 56/16.4
[58] Field of Search .................. 56/34.1, 16.4, 1; 100/88

[56] References Cited

U.S. PATENT DOCUMENTS

| | | | |
|---|---|---|---|
| 3,680,296 | 8/1972 | Beebout | 56/341 X |
| 3,751,890 | 8/1973 | Gay et al. | 56/341 X |
| 3,792,574 | 2/1974 | Best | 56/341 |
| 3,797,215 | 3/1974 | Kopaska | 56/341 |
| 3,815,344 | 6/1974 | Kucera | 56/341 |
| 4,183,197 | 1/1980 | Kucera | 56/341 |
| 4,386,493 | 6/1983 | Holdeman et al. | 56/341 |
| 4,625,502 | 12/1986 | Gerhardt et al. | 56/341 |
| 4,763,464 | 8/1988 | Mourett | 56/341 |

Primary Examiner—Stephen J. Novosad
Attorney, Agent, or Firm—Rudolph L. Lowell

[57] ABSTRACT

The ground rolling bale forming machine has a plurality of belts having expandable lower run portions for rolling the bale material along the ground. The lower belt runs are trained about a material pick-up means and a movable bottom front roller. In a bale starting position, the bottom roller is adjacent the pick-up means and is movable forwardly to a bale formed position in response to the growing diameter of the bale. The axes of the pick-up means and bottom roller are in a generally common horizontal plane throughout the forming operation to provide for an enclosing engagement of the lower belt runs about a major portion of the peripheral surface of the bale.

6 Claims, 3 Drawing Sheets

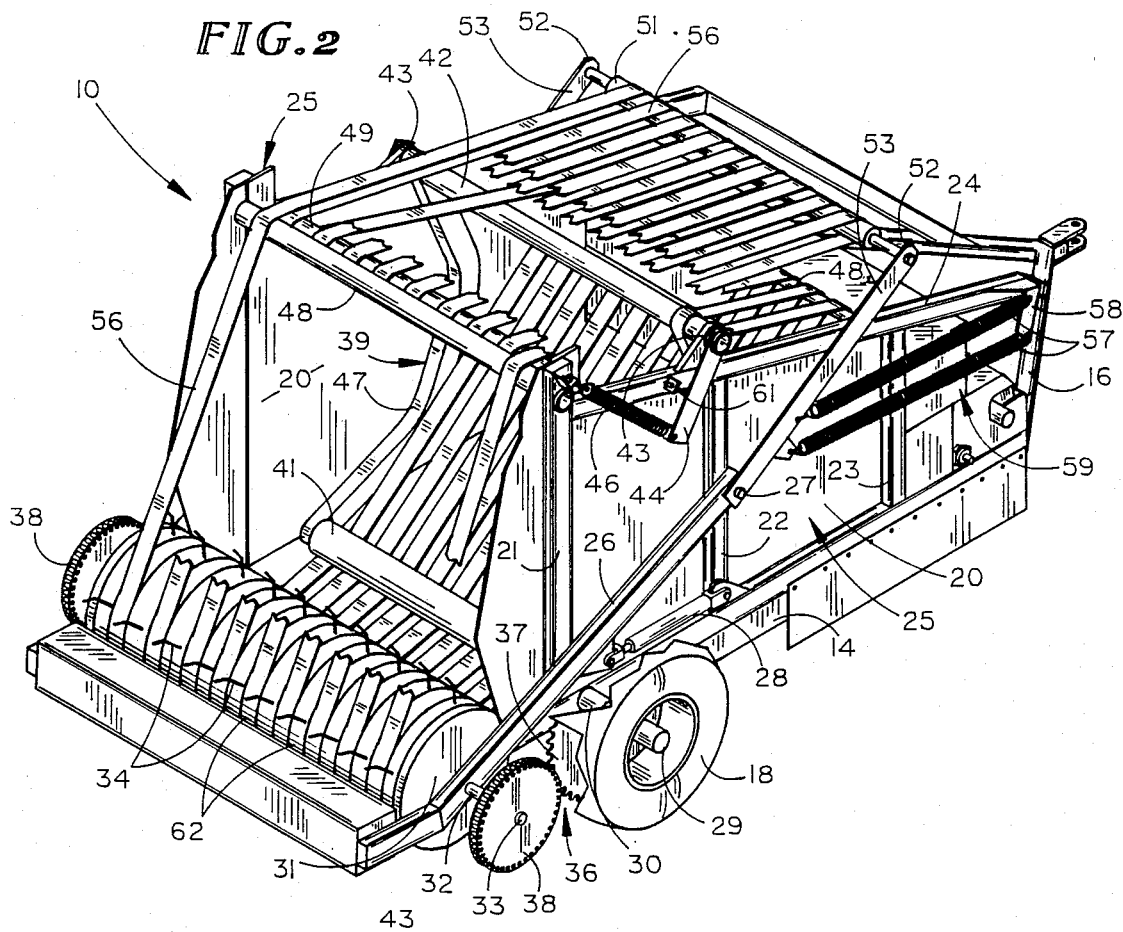
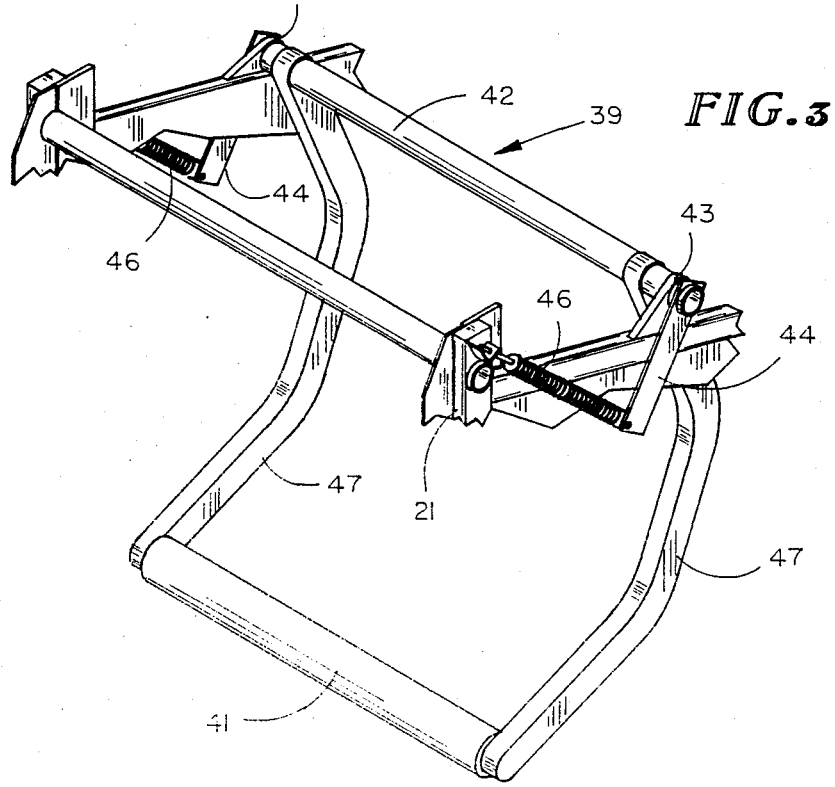

4,910,950

MACHINE FOR FORMING LARGE ROUND BALES

BACKGROUND OF THE INVENTION

Ground rolling bale forming machines are well-known in the art as evidenced by U.S. Pat. Nos. 3,110,145, 3,680,296, 3,797,215, 3,815,344 and 4,183,197. In these patents, the material picked up by the pick-up means is rolled along the ground and a round bale is formed by the action of a lower run of an endless flexible means such as belts or the like. This lower run is expandable upwardly in response to the growing diameter of the bale and is trained about members spaced a fixed distance apart to accommodate therebetween the diameter of the completed bale. In the forming of the bale, therefore, only a relatively small portion of its peripheral surface is acted upon by the lower run whereby to appreciably reduce the efficiency of the flexible means to roll and compact the forming bale. These disadvantages of the prior art are eliminated in the bale forming machine of the present invention.

SUMMARY OF THE INVENTION

The ground rolling bale forming machine of this invention provides endless belt means having expandable, forwardly moving lower runs trained about a material pick-up means and a movable lower front roller so as to be inclined upwardly and forwardly from the pick-up means. The lower roller is adjacent to the pick-up means in a bale starting position and is movable forwardly to a bale formed position remote from the pick-up means in response to the growing diameter of the bale. This forward movement of the lower front roller takes place in a generally horizontal plane so that substantially the full length of the lower runs of the belt means are retained in a continuous enclosing engagement with the major portion of the peripheral surface of the bale throughout the bale forming operation. The bale is thus positively rolled along the ground and subjected to a maximum compacting action by the belts to efficiently form a firm round bale.

DESCRIPTION OF THE DRAWINGS

FIG. 2 is a perspective view of the machine with portions broken away to better show the arrangement of the ground operated drive system for the belt means;

FIG. 3 is an enlarged perspective view of the front lower belt supporting roller;

DETAILED DESCRIPTION OF THE INVENTION

Figure 1:
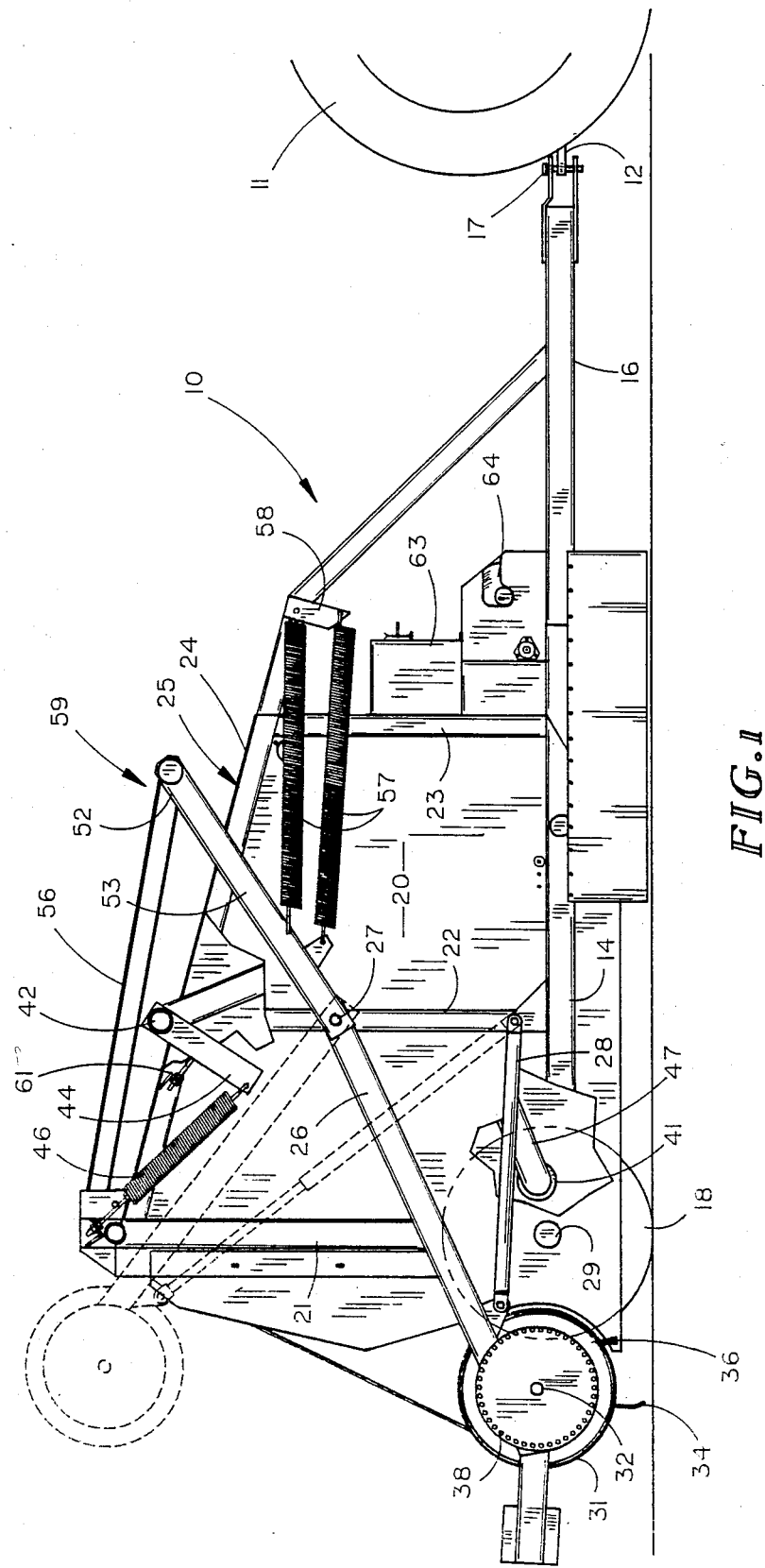
FIG. 1 is a side elevational view of the bale forming machine of this invention with portions broken away for clarity.

Referring to FIG. 1 of the drawings, the round bale forming machine of this invention indicated generally at 10 is shown in assembly relation with a farm tractor (not shown) having rear traction wheels 11 and a rear draw bar 12. The baling machine 10 is shown as being of a pull type and includes a mobile frame (FIGS. 1 and 2), having a base section 14 of a generally U-shape in plan view open at its rear end and having a forwardly projected tongue structure 16 connected by a hitch pin 17 with the draw bar 12. The base section 14 is supported on a pair of rear ground wheels 18 supported on an adjacent side of the base section 14.

Projected upwardly from each side of the base portion 14 is a series or set of three longitudinally spaced upright support members 21, 22 and 23 (FIGS. 1 and 2). The upright members 21 shall be hereinafter referred to as the rear upright members; the members 22 as the intermediate upright members; and the members 23 as front upright members. The upper portions of each series or set of the members 21, 22 and 23 are secured together by an associated longitudinally extended brace or connecting member 24. Each series of upright members on the base portion 14 has a panel 20 secured to the inner surfaces thereof to provide the mobile frame with a pair of transversely opposite frame structures or side walls 25.

A pair of rearwardly and downwardly extended pivoted arms 26 (FIGS. 1 and 2) have their upper forward ends supported on pivot shafts 27 carried on the intermediate upright members 22. The lower rear ends of the pivoted arms 26 are pivotally moveable up and down relative to the rear ends of the side walls 25 to a lower position, limited by their engagement with the side members of the base portion 14, and to an elevated position projected upwardly and rearwardly from the intermediate upright members 22 to the dotted line position shown in FIG. 1. The pivoted arms 26 are raised and lowered by associated hydraulic cylinder assemblies 28, each of which extends between and is pivotally connected to a corresponding intermediate upright member 22 and a pivoted arm 26. A wheel shaft 29 for each of the ground wheels 18 is rotatably supported in a bearing unit 30 mounted adjacent the lower end of a corresponding rear upright member 21.

A material pick-up device 31 (FIG. 2) extends transversely between and is rotatably supported on the rear ends of the pivoted arms 26 and includes an axially extended shaft 32 having end portions 33 projected laterally outwardly from the rear ends of the pivoted arms 26. The pick-up device 31 is of a usual type provided with retractable tines 34 that are radially extended to pick up material and then retracted to release the material.

The pick-up device 31 is operated from the ground wheels 18 by a pair of like ground-driven power transmission systems 36. Since each power transmission system 36 is of a like construction and similar in operation, only one thereof will be described in detail with corresponding numbers being applied to like parts. A power transmission system 36 includes a drive sprocket 37 mounted on the shaft 29 of a ground wheel 18 at a position laterally outwardly from the base portion 14. Each projected end portion 33 of the pick-up shaft 32 extends through and laterally outwardly from an associated pivoted arm 26. A sprocket gear 38 mounted on a shaft end portion 33 is arranged in the plane substantially common to the plane of a drive sprocket 37 so as to be releasably engageable with the drive sprocket when a pivoted arm 26 is in a lowered position and for disengagement from the drive sprocket 37 on movement of the pick-up device 31 toward its upper or bale release position. The sprockets 37 and 38 are of a relative size to provide for the peripheral speed of the pick-up device 31 being substantially equal to the linear forward speed of the machine.

Located between the side walls 25 of the machine is a pivoted arm assembly 39 for a front bottom transverse roller 41. The arm assembly 39 (FIGS. 2 and 3) includes a rock shaft 42 extended transversely of the mobile frame at a position above the side walls 25 for rotatable support in bearing members 43 mounted on and projected upwardly from an adjacent longitudinal connecting member 24 at positions adjacent the upper ends of the intermediate upright members 22. A rock arm 44 is carried at each end of the rock shaft 42 outwardly from an adjacent side wall 25. A tension spring 46 is connected between the upper end of each rear upright member 21 and the free end of a rock arm 44 for a purpose to appear later.

The rock shaft 42 carries a depending upright arm member 47 at each end thereof and inwardly of an adjacent side wall 25. Each arm member 47 is of a substantially arcuate shape having a concave rear side and is of a length to support the front bottom roller 41 for pivotal or rockable movement from a bale starting position (FIG. 4) adjacent the pick-up means 31 to a bale formed position (FIG. 5) adjacent the forward end of the machine frame.

A fixed front upper roller 48a (FIG. 2) is rotatably supported adjacent the upper ends of the front upright members 23 and a pair of fixed rear upper rollers 48 and 49 are rotatably supported adjacent the upper ends of the rear upright members 21. A transversely extended moveable roller 51 extends between and is rotatably supported at the free or upper ends 52 of a pair of pivoted arm members 53 positioned outwardly from adjacent upright side walls 25. The lower ends of the pivoted arm members 53 are pivotally supported on the pivot shafts 27 of the arms 26. The roller 51 is pivotally moveable longitudinally in a path above the side walls 25 to provide for the expansion of the lower runs 54 of roller supported belts 56 about the peripheral portion of a bale being formed. The pivoted arms 53 and, in turn, the moveable roller 51 are continuously and yieldably urged in a direction toward the front end of the machine by a pair of coil springs 57 arranged outwardly of the side walls 25 and connected in tension with an associated pivoted arm 53 and a connecting member 58 secured to a forward portion of a side wall 20. The moveable roller 51, pivot arms 53 and springs 57 constitute a belt tensioning device 59. By varying the tension of the springs 57, the compaction or density of a bale being formed may be varied. In this respect, it will be noted that the area enclosed by the pick-up device 31, the front moveable bottom roller 41, side walls 25, and lower runs 54 of the belts 56 defines a baling zone for a bale 55 being formed (FIGS. 4 and 5).

The belt tensioning device 59 maintains a tension on the flexible members or belts 56 that are spaced transversely of the machine between the side walls 25 in operative association with the rollers 41, 48, 48a, 49 and 51 and the pick-up device 31. The belts are driven in an upright path longitudinally of the frame by the pick-up device 31, which additionally, through the lower belt runs 54, provides for a forward rotation of the forming bale 55 along the ground. As shown in FIG. 2, the belts 56 are trained about a plurality of axially spaced pulleys 62 on the pick-up device 31 with a tine 34 positioned between adjacent pulleys.

When a bale 55 is to be formed, the pick-up device 31 (FIG. 4) is in its lower position with the front bottom roller 41 in a bale starting position located forwardly of and adjacent to the pick-up device 31. This position of the roller 41 is defined on the engagement of the rock arms 44, by the springs 46, with adjustable stop members 61 mounted on an adjacent side wall 25. When the roller 41 is in its starting position, the lower belt runs 54 are inclined upwardly and forwardly from the pick-up device 31 for movement in a forward direction to roll thereunder the material gathered by the pick-up device 31. In response to the growing diameter of the forming bale, the roller 41 is progressively moved by the bale in a forward direction to the bale completion position shown in FIG. 5.

Figure 4:
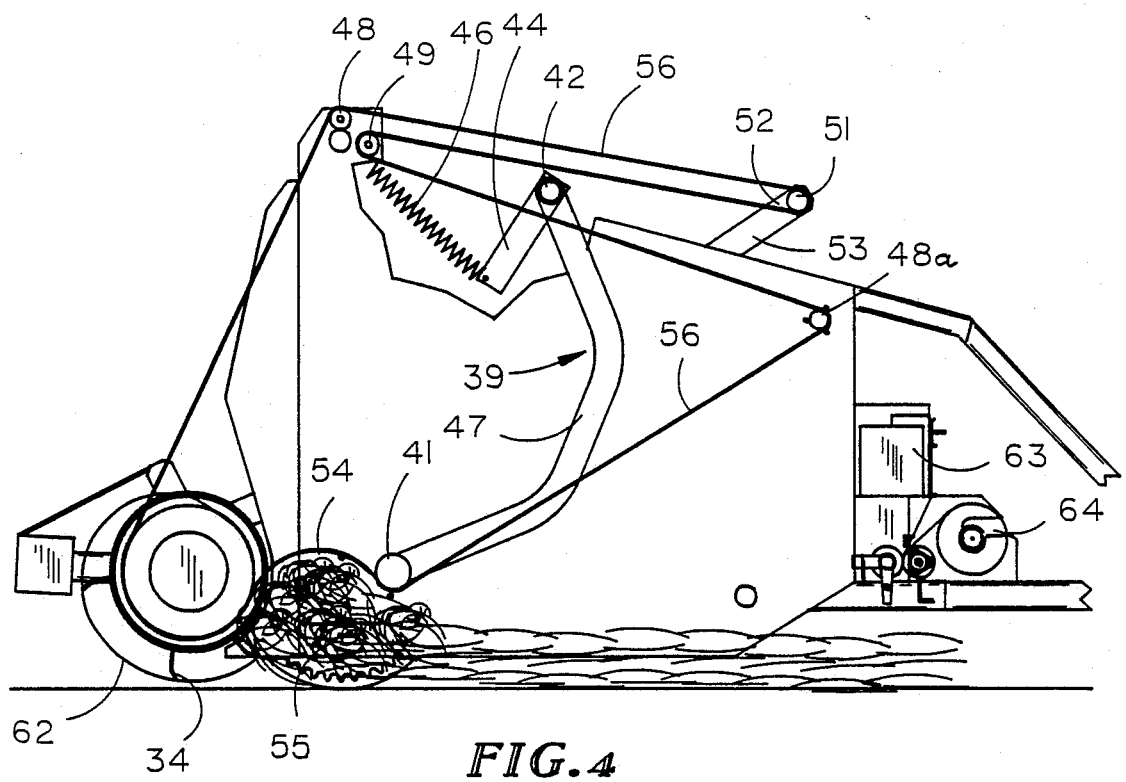
FIG. 4 is a diagramatic side elevational view showing the lower roller of FIG. 3 in a bale starting position.
Figure 5:
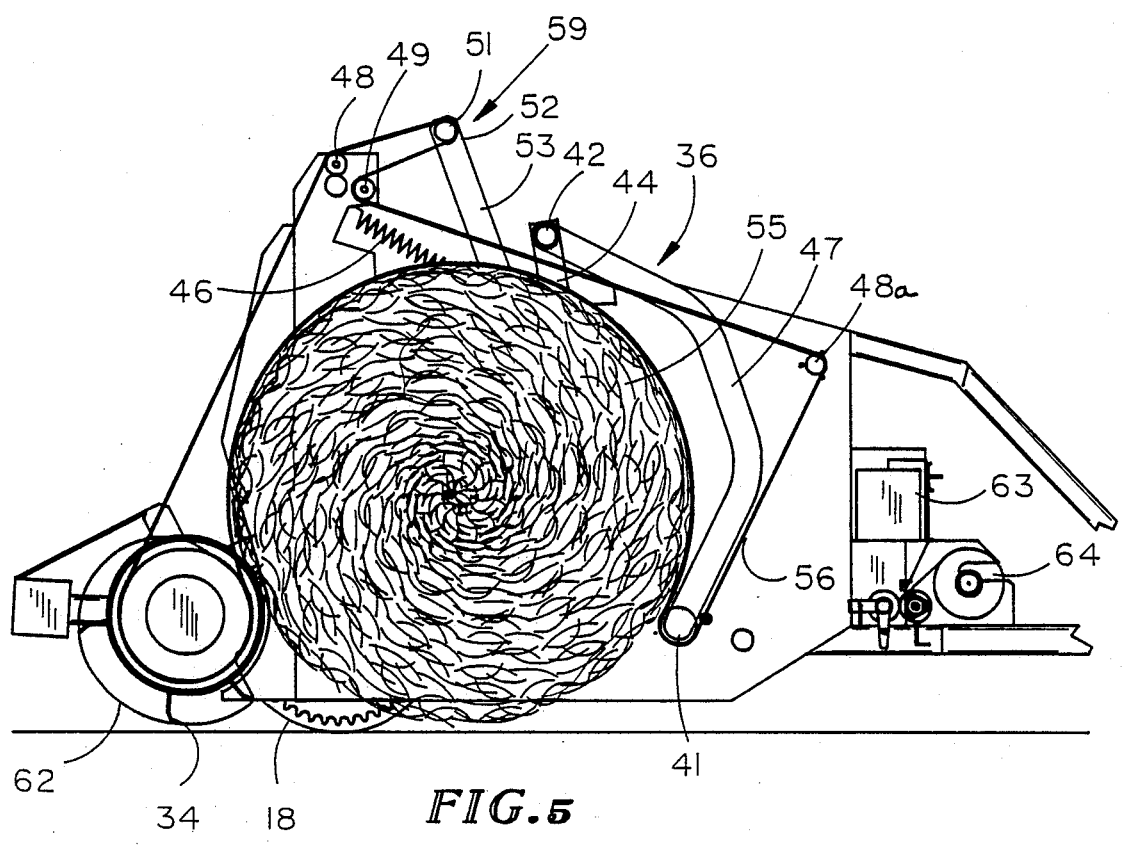
FIG. 5 is illustrated similarly to FIG. 4 and shows the lower roller in a bale formed position adjacent the forward end of the baling machine.

This forward movement of the roller 41, as clearly illustrated in FIGS. 4 and 5, takes place in a substantially horizontal plane common to the transverse axes of the roller 41 and pick-up device 31. As a result of this generally horizontal movement of the roller 41, the lower belt runs 54 are retained in enclosing engagement with the major peripheral portion of a bale 55 throughout the bale forming operation, with the arcuate shape of the arm members 47 providing for a clearance relation with the bale 55 throughout the bale forming operation.

On completion of a bale, the machine 10 is moved clear of the ground material to be baled and on being moved forwardly wrapping twine from a twine supply 63 (FIG. 5) may be introduced on the ground forwardly of the bale 55 for engagement and wrapping by the bale. In lieu of wrapping twine, a plastic sheet material or a net material from a roll 64 may be used to both wrap the bale and shield the bale from the elements. The pick-up device 31 is then moved to its elevated position shown in FIG. 1 so as to pass over the formed bale 55 on a continued forward movement of the machine 10. On return of the pick-up device 31 to its lowered position in releasable driven connection with the ground wheels 18, the front bottom roller 41 is automatically returned to its bale starting position by the coil springs 46.

It is seen therefore that the operation of the front bottom roller 41 continuously maintains the lower belt runs 54 in yieldable engagement about a major portion of the peripheral surface of a bale 55 during a forming operation to maintain a positive rolling action of the bale on the ground with maximum compaction by the belts 56 to provide a firm bale of desired density.

Although the invention has been described with respect to a preferred embodiment thereof it is to be understood that it is not to be so limited since changes can be made therein within the full intended scope of the invention as defined in the appended claims.

I claim:

1. A machine for rolling crop material along the ground to form a large cylindrical bale comprising:
   (a) a mobile frame having a pair of upright transversely opposite frame structures;
   (b) a rotatable material pick up means extended transversely of and adjacent the rear end of the mobile frame;
   (c) endless flexible means;
   (d) means supporting said endless flexible means on said frame structures for movement in an upright path longitudinally of said mobile frame, including a bottom front roller;
   (e) said endless flexible means, including a lower run portion extended upwardly and forwardly from said pick up means to said bottom roller and moveable in a forward direction to engage and roll on the ground the material gathered by the pick up means; and (f) means movably supporting said bottom roller on said frame for forward movement from a bale starting position adjacent said pick up means to a bale formed position remote from said pick up means in response to the diametrically growing bale being rolled on the ground.

2. The machine, according to claim 1, wherein:
(a) said bottom roller and pick up means extend transversely of said frame, with the axes thereof located in a substantially common horizontal plane during a bale forming operation.

3. The machine, according to claim 1, wherein:
(a) said supporting means for the bottom roller includes a pair of transversely opposite upright arm members, each of which is pivotally mounted at the upper end thereof on an adjacent frame structure;
(b) means rotatably supporting said bottom roller on and between the lower end portions of said arm members;
(c) a tension mechanism on said frame for applying and maintaining a tension on said endless flexible means; and
(d) means on said frame for yieldably urging said arm members in a direction to move the bottom roller to the bale starting position therefor.

4. The machine, according to claim 3, wherein:
(a) each of said arm members is of a generally arcuate shape having a rearwardly facing concave side providing for a clearance relation of the arm members with the peripheral surface of the diametrically growing bale during a bale forming operation.

5. The machine, according to claim 1, including:
(a) means movably supporting said pick up means on said frame structures for movement from a lower material pick up position adjacent the rear lower end portions of said frame structures to an elevated bale discharge position providing for the passage thereunder of a completed bale, and
(b) coacting means on said pick up means and on at least one of said ground wheels to releasably connect said pick up means in a driven relation with said one ground wheel when the pick up means is in the lower position therefor, and to release said pick up means when the pick up means is moved out of said lower position toward the elevated position therefor.

6. The machine, according to claim 5, including:
(a) a weight carrying means on said pick up supporting means and projected rearwardly from said pick up means to counter the action of a growing bale on the lower run portions of the endless flexible means tending to lift the ground wheels upwardly.

* * * * *